3,296,229
3-NORTRICYCLYLACETIC ACID AND DERIVATIVES THEREOF

David J. Trecker and Joseph P. Henry, South Charleston, and John W. Lynn, Charleston, W. Va., assignors to Union Carbide Corporation, a corporation of New York
No Drawing. Filed Feb. 24, 1964, Ser. No. 347,003
9 Claims. (Cl. 260—85.5)

This invention relates to 3-nortricyclylacetic acid and its vinyl ester and to polymers of the vinyl ester.

3-nortricyclylacetic acid is readily produced by the free-radical catalyzed reaction of acetic acid and bicyclo-[2.2.1]hepta-2,5-diene, as is illustrated by the equation:

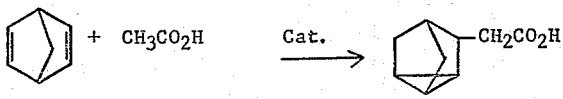

For reaction is conducted at elevated temperatures, generally from about 50° C. to about 250° C. and preferably in the range of from about 100° C. to about 150° C.

The acetic acid is preferably employed in molar excess over bicyclo[2.2.1]hepta-2,5-diene to inhibit the tendency of the diene to form telomers or homopolymers. Molar ratios of acetic acid to diene of at least 5:1 are preferred. A particularly preferred procedure comprises slowly feeding bicyclo[2.2.1]hepta-2,5-diene to a large excess of acetic acid.

The catalysts employed are those which liberate free radicals when heated to a temperature within the range specified above, including organic peroxides and azo compounds. Illustrative examples of suitable catalysts include the azo compounds, such as those disclosed in U.S. Patent No. 2,471,959, and the peroxides, including hydrogen peroxide, lauroyl peroxide, acetyl peroxide, tert.-butyl hydroperoxide, di-tert.-butyl peroxide, acetyl benzoyl peroxide, urea peroxide, tetralin hydroperoxide and the like; the alkali metal and ammonium persulfates, perborates and percarbonates, diisopropylperoxydicarbonate and the like, etc.

The amount of catalyst employed is a reaction-promoting amount, i.e., an amount sufficient to promote the reaction of acetic acid with the diene. In general, amounts of at least 5 mole percent, based on bicyclo[2.2.1]hepta-2,5-diene, are employed.

The reaction is preferably conducted under an inert, preferably nitrogen, atmosphere, to prevent oxidation of the diene, and to prevent chain termination by reaction of free radical intermediates with oxygen.

Solvents or diluents can be employed if desired but are generally unnecessary because the excess acetic acid adequately serves as the reaction medium.

The reaction time is not highly critical and can vary from as low as a few minutes or less to several hours or even days if desired. However, the time must be sufficiently long at a given temperature to permit decomposition of the catalyst, and overly long reaction times may lead to product decomposition.

The 3-nortricyclylacetic acid is recovered from the reaction mixture by conventional techniques, for example, by distillation.

The acid of this invention is readily converted to its vinyl ester by reaction with a vinyl ester such as vinyl acetate, in accordance with known acidolysis techniques, and the vinyl ester recovered by distillation. Alternatively, the vinyl ester can be produced by reaction of the acid of this invention with ethylene or acetylene in contact with a suitable catalyst in accordance with known techniques.

The vinyl ester of this invention is readily polymerized, either alone or together with one or more olefinically unsaturated compounds copolymerizable therewith, by conventional techniques, as by a free-radical catalyzed process employing solvent, bulk, suspension or emulsion processes, either batchwise or continuously.

The polymerization is generally conducted at elevated temperatures, and temperatures of from about 25° C. to about 250° C. have been found suitable. However, it is preferred to employ temperatures of from about 150° C. to about 175° C.

The catalysts which are employed in the production of the copolymers of this invention are the free-radical catalysts, such as those described above. The catalysts are employed in amounts sufficient to catalyze the copolymerization, generally from about 1 p.p.m. to about 10,000 p.p.m. or higher, based on the total weight of polymerizable monomers, with amounts of from about 2 p.p.m. to about 200 p.p.m. being preferred.

Reaction media, such as solvents for the catalyst and the vinyl monomer, are preferably employed. As examples of suitable reaction media one can mention liquid hydrocarbons such as isooctane, isononane, cyclohexane, benzene and the like.

The polymers of this invention can be recovered from the reaction mixture by methods known to those skilled in the art.

As examples of suitable comonomers one can mention hydrocarbons such as ethylene, propylene, butadiene, styrene and the like, the vinyl and vinylidene halides such as vinyl chloride, vinylidene chloride, vinylidene bromide and the like; vinyl esters such as vinyl formate, vinyl acetate, vinyl propionate, vinyl butyrate, vinyl chloroacetate, vinyl chloropropionate, and the like; acrylic and alpha-alkyl acrylic acids and their nitriles such as acrylic acid, chloroacrylic acid, methacrylic acid, ethacrylic acid, methyl acrylate, ethyl acrylate, butyl acrylate, n-octyl-acrylate, 2-ethylhexyl acrylate, n-decyl acrylate, methyl methacrylate, butyl methacrylate, methyl ethacrylate, ethyl ethacrylate, N-methyl acrylamide, N,N-di-methylacrylamide, N - methylmethacrylamide, N,N - dimethylmethacrylamide, acrylonitrile, chloroacrylonitrile, methacrylonitrile, ethacrylonitrile, and the like; maleic and fumaric acids, and their esters such as dimethyl maleate, diethyl maleate, butyl hydrogen maleate, trialkyl etaconates, and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; N-methyl-N-vinyl acetamide, N-vinylcarbazole, N-vinylpyrrolidone, ethyl methylene malonate; polymerizable cycloolefins such as bicyclo[2.2.2]oct-2-ene, their 5-substituted compounds and the like, bicyclo[2.2.1]hepta-2,5-diene, bicyclo[2.2.2]octa-2,5-diene, et cetera.

The following examples are illustrative.

*Example 1.—3-nortricyclylacetic acid*

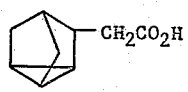

A 5-liter, round-bottom flask equipped with a reflux condenser, dropping funnel, thermocouple well, nitrogen inlet and stirrer was charged with 2268 grams of acetic acid. After flushing the flask with nitrogen for 30 minutes, the flask was heated to reflux (about 120° C.) while maintaining the nitrogen flow. A solution of 52.3 grams of bicyclo[2.2.1]-hepta-2,5-diene and 11.0 grams of tert-butyl peroxide in 1134 grams of acetic acid was added dropwise to the refluxing mixture over 12 hours, and the resulting mixture was refluxed for an additional 12 hours. After vacuum distillation to remove unreacted acetic acid, there were recovered 43.6 grams of 3-norticyclyl-acetic acid as six fractions boiling at 113–114° C. and 1 mm. The indices of refraction, $n_D^{20}$, of the fractions were 1.4919–1.4920. The structure was confirmed by infrared analysis.

*Microanalysis.*—Calculated for $C_9H_{12}O_2$: C, 71.00; H, 7.96. Found: C, 70.70; H, 7.98.

*Example 2.—Vinyl 3-nortricyclylacetate*

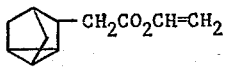

A solution of 3 grams of concentrated sulfuric acid in 15 ml. of acetic acid was added dropwise over one hour to a solution of 6 grams of mercuric acetate in 1023 grams of vinyl acetate. Then 212 grams of 3-nortricyclylacetic acid produced in a manner similar to that described in Example 1 were added rapidly and the mixture was stirred at room temperature for 80 hours, whereupon 5 grams of sodium acetate were added and the mixture stirred for an additional two hours. After filtration and vacuum stripping to remove low-boiling components, there were recovered 147 grams of vinyl 3-nortricyclylacetate at 82–84° C. and 2 mm. The vinyl nortricyclylacetate had an index of refraction, $n_D^{30}$, of 1.4855. The structure was confirmed by infrared analysis.

*Microanalysis.*—Calculated for $C_{11}H_{14}O_2$: C, 74.13; H, 7.92. Found: C, 74.34; H, 7.92.

*Example 3*

A Pyrex polymerization tube was cooled to $-80°$ C. and charged under a nitrogen atmosphere with 5 milliliters of isooctane, 5 grams of the vinyl 3-nortricyclylacetate prepared as described in Example 2 and 0.2 gram of diisopropylperoxydicarbonate. The bottle was sealed, warmed to 25° C. and held at 25° C. for 3 days. The bottle was opened and the contents were dissolved in toluene and then poly(vinyl 3-nortricyclylacetate) was precipitated by slurrying in isooctane. After drying, the polymer weighed 2.32 grams, softened at 65–70° C. and had a reduced viscosity of 0.15 in cyclohexanone, as determined at 25° C. from a solution of 0.2 gram of polymer in 100 grams of cyclohexanone. The polymer was molded at 110° C. and 2000 p.s.i. to form a clear plaque.

*Example 4*

Employing apparatus and procedures similar to those described in Example 3, except that solvent was eliminated and 0.2 gram of acetyl peroxide was substituted for the diisopropylperoxydicarbonate, there were recovered 3.34 grams of poly(vinyl 3-nortricyclylacetate) which softened at 65–70° C. and was insoluble in cyclohexanone. A sample was molded for 10 seconds at 110° C. and 500 p.s.i. to obtain a clear plaque. The polymer had a tensile strength of 868 p.s.i. and an elongation of 0.7 percent as determined according to ASTM D–638–56T.

*Example 5*

A Pyrex polymerization bottle was cooled to $-78°$ C. and charged under a nitrogen atmosphere with 5 grams of the vinyl 3-nortricyclylacetate produced as described in Example 2, 0.2 gram of diisopropylperoxydicarbonate and 5 milliliters of vinyl acetate. The bottle was sealed and heated at 40° C. for 24 hours and then held at room temperature for 72 hours. The bottle was opened and the contents precipitated in alcohol, dissolved in methylene chloride and, after evaporation of the methylene chloride, vacuum dried. There were recovered 7.6 grams of a vinyl 3-nortricyclylacetate/vinyl acetate copolymer having a reduced viscosity of 0.47 in chloroform and a softening point of about 40° C.

*Example 6*

Employing apparatus and procedures similar to those described in Example 5, except that 5 milliliters of vinyl chloride were substituted for the vinyl acetate, there were produced 8.9 grams of a vinyl 3-nortricyclylacetate/vinyl chloride copolymer having a reduced viscosity of 0.60 in chloroform and a softening point of about 45° C.

*Example 7*

Employing apparatus and procedures similar to those described in Example 5, except that 5 milliliters of styrene were substituted for the vinyl acetate, there were produced 3.0 grams of a vinyl 3-nortricyclylacetate/styrene copolymer having a reduced viscosity of 0.125 in chloroform and a softening point of about 40° C.

*Example 8*

Employing apparatus and procedures similar to those described in Example 5, except that acrylonitrile is substituted for vinyl acetate, there is produced a solid vinyl 3-nortricyclylacetate/acrylonitrile copolymer.

*Example 9*

Employing apparatus and procedures similar to those described in Example 5, except that 5 milliliters of methyl methacrylate was substituted for the vinyl acetate, there were produced 5.9 grams of a vinyl 3-nortricyclylacetate/methyl methacrylate copolymer.

What is claimed is:
1. Vinyl 3-nortricyclylacetate.
2. A normally-solid polymer of vinyl 3-nortricyclylacetate.
3. Normally-solid poly(vinyl 3-nortricyclylacetate).
4. A normally-solid copolymer of vinyl 3-nortricyclylacetate and a second olefinically-unsaturated monomer copolymerizable therewith.
5. A normally-solid copolymer of vinyl 3-nortricyclylacetate and vinyl acetate.
6. A normally-solid copolymer of vinyl 3-nortricyclylacetate and vinyl chloride.
7. A normally-solid copolymer of vinyl 3-nortricyclylacetate and styrene.
8. A normally-solid copolymer of vinyl 3-nortricyclylacetate and acrylonitrile.
9. A normally-solid copolymer of vinyl 3-nortricyclylacetate and methyl methacrylate.

References Cited by the Examiner

UNITED STATES PATENTS

| | | | |
|---|---|---|---|
| 2,716,662 | 8/1955 | Cohen et al. | 260—514 |
| 2,738,356 | 3/1956 | Soloway et al. | 260—89.1 |
| 2,899,462 | 8/1959 | Bavley et al. | 260—514 |
| 2,921,932 | 1/1960 | Erbaugh et al. | 260—85.5 |
| 3,033,848 | 5/1962 | Caldwell | 260—85.5 |
| 3,053,882 | 9/1962 | Miller | 260—468 |
| 3,164,573 | 1/1965 | Schweiker | 260—89.1 |

JOSEPH L. SCHOFER, *Primary Examiner.*

DONALD E. CZAJA, *Examiner.*

H. WONG, *Assistant Examiner.*